(12) United States Patent
Zhang et al.

(10) Patent No.: US 10,757,551 B2
(45) Date of Patent: Aug. 25, 2020

(54) VEHICLE-TO-INFRASTRUCTURE (V2I) MESSAGING SYSTEM

(71) Applicant: Ford Global Technologies, LLC, Dearborn, MI (US)

(72) Inventors: Linjun Zhang, Canton, MI (US); Helen Elizabeth Kourous-Harrigan, Monroe, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 18 days.

(21) Appl. No.: 16/162,442

(22) Filed: Oct. 17, 2018

(65) Prior Publication Data

US 2020/0128372 A1  Apr. 23, 2020

(51) Int. Cl.
  *H04W 4/44* (2018.01)
  *H04W 4/12* (2009.01)

(52) U.S. Cl.
  CPC .............. *H04W 4/44* (2018.02); *H04W 4/12* (2013.01)

(58) Field of Classification Search
  None
  See application file for complete search history.

(56) References Cited

U.S. PATENT DOCUMENTS

| | | | |
|---|---|---|---|
| 6,049,295 A * | 4/2000 | Sato ...................... | G08G 1/164 235/375 |
| 7,383,121 B2 | 6/2008 | Shinada | |
| 9,930,120 B2 | 3/2018 | Gutierrez | |
| 9,935,710 B2 | 4/2018 | Spaulding et al. | |
| 10,157,539 B1 * | 12/2018 | Hoover ................. | G08G 1/0112 |
| 10,377,374 B1 * | 8/2019 | Droz ...................... | B60W 30/09 |
| 2006/0184312 A1 * | 8/2006 | Kiim ...................... | G08G 1/017 701/117 |
| 2009/0128323 A1 * | 5/2009 | Milbar ................... | G08B 27/008 340/539.1 |
| 2012/0206483 A1 * | 8/2012 | Funabashi ......... | G08G 1/096716 345/629 |
| 2014/0095596 A1 * | 4/2014 | Singh ................. | H04M 3/42059 709/204 |
| 2014/0195138 A1 * | 7/2014 | Stelzig ................. | G08G 1/0116 701/119 |
| 2017/0301237 A1 | 10/2017 | MacNeille et al. | |
| 2018/0003965 A1 * | 1/2018 | O'Toole ................ | G08G 1/167 |
| 2018/0213365 A1 * | 7/2018 | Yi ............................ | H04W 4/06 |
| 2018/0259975 A1 * | 9/2018 | Dold ...................... | H04W 4/44 |
| 2018/0350230 A1 * | 12/2018 | Kienitz ................. | G08G 1/0112 |

(Continued)

FOREIGN PATENT DOCUMENTS

| | | |
|---|---|---|
| JP | 2002190094 A | 7/2002 |
| JP | 201826095 A | 2/2018 |

OTHER PUBLICATIONS

Kumar, "Visible Light Communication Based Traffic Information Broadcasting Systems", International Journal of Future Computer and Communication, vol. 3, No. 1, Feb. 2014.

*Primary Examiner* — German Viana Di Prisco
(74) *Attorney, Agent, or Firm* — Frank A. MacKenzie; Bejin Bieneman PLC

(57) ABSTRACT

An infrastructure node and a method of using the node. The node may comprise a processor and memory. The memory may store instructions executable by the processor that include, to: identify a hazard to a target vehicle; and based on the identification, transmit a private message to the target vehicle using a line-of-sight (LOS) transmission.

20 Claims, 7 Drawing Sheets

(56) References Cited

U.S. PATENT DOCUMENTS

| | | | |
|---|---|---|---|
| 2019/0019411 A1* | 1/2019 | Sweeney | G08G 1/163 |
| 2019/0068312 A1* | 2/2019 | Zhang | H04L 1/0023 |
| 2020/0021962 A1* | 1/2020 | Kong | H04W 64/006 |

* cited by examiner

US 10,757,551 B2

VEHICLE-TO-INFRASTRUCTURE (V2I) MESSAGING SYSTEM

BACKGROUND

Traffic accidents sometimes occur as a result of a driver having an inability to sense things outside of his/her direct line-of-sight until a collision becomes imminent. Vehicles operating in an autonomous mode may experience even greater risks, as the onboard computing systems may not be programmed to consider scenarios which the human driver may predict—e.g., based on previous driving experience. Accordingly, there is a need to provide more information to vehicles—especially autonomously-operated vehicles—particularly when at least a portion of the vehicle's field of view is obstructed.

DETAILED DESCRIPTION

Figure 1:
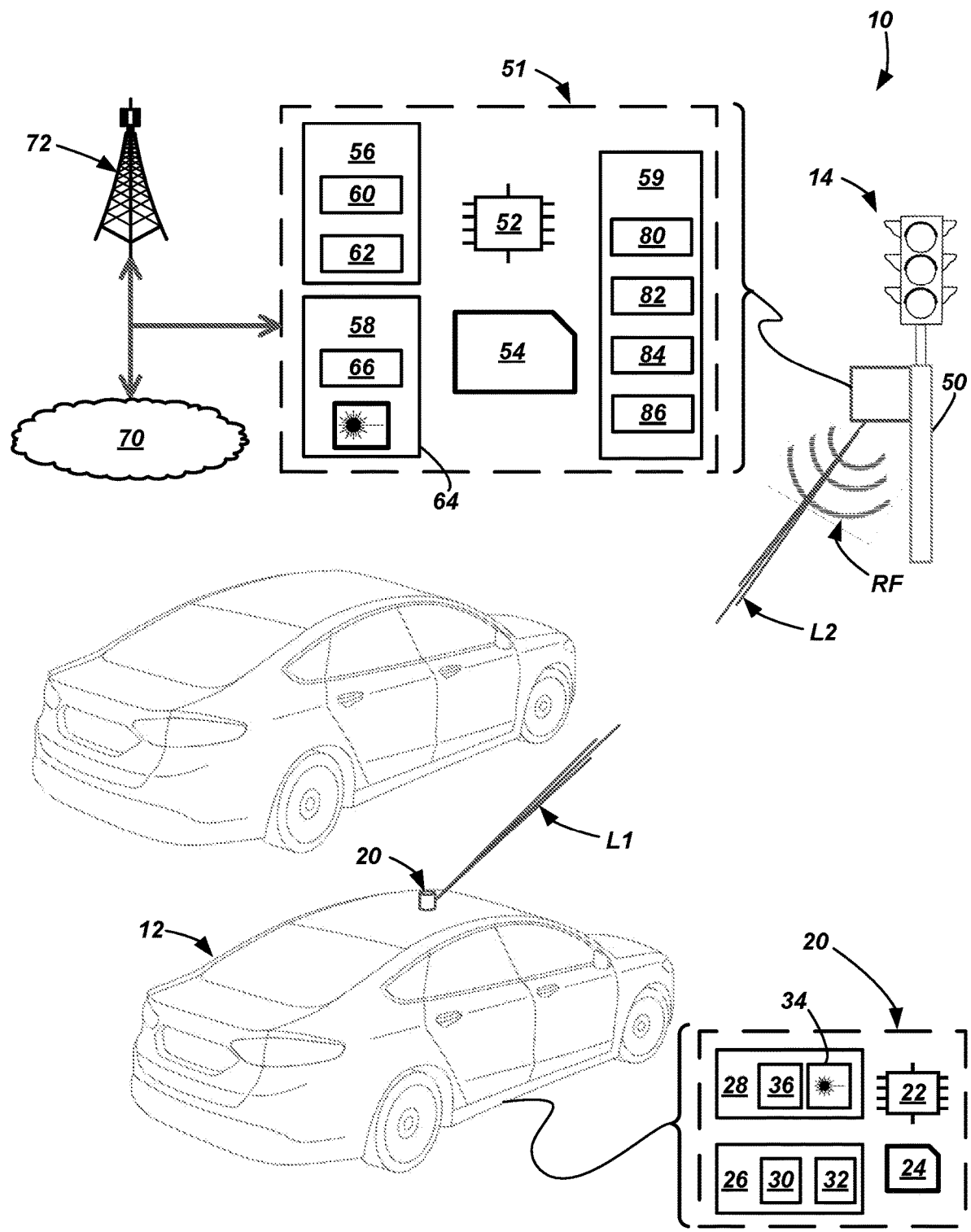
FIG. 1 is a schematic view of a vehicle-to-infrastructure (V2I) messaging system enabling infrastructure to communicate with one or more target vehicles.

An infrastructure node is described in detail below that includes a processor; and memory storing instructions, executable by the processor, that comprise, to: identify a hazard to a target vehicle; and based on the identification, transmit a private message to the target vehicle using a line-of-sight (LOS) transmission.

According to the at least one example set forth above, identifying the hazard further comprises determining a blind spot region of the target vehicle.

According to the at least one example set forth above, the instructions further comprise, to: concurrent to the transmission of the private message, broadcast a public message using radio frequency (RF).

According to the at least one example set forth above, identifying the hazard further comprises, to: determine path data, speed data, acceleration data, or a combination thereof of the target vehicle.

According to the at least one example set forth above, identifying the hazard further comprises, to: classify an object using sensor data; determine path data, speed data, acceleration data, or a combination thereof of the object; and determine a collision event involving the target vehicle and the object.

According to the at least one example set forth above, identifying the hazard further comprises, to: determine that the hazard data is dynamic-hazard data; and based on the determination, determine to transmit the private message.

According to the at least one example set forth above, transmitting the private message further comprises, to: prioritize the private message based on a threat level.

According to the at least one example set forth above, the instructions further comprise, to: prior to identifying the hazard, receive a communication from the target vehicle; and in response to receiving the communication from the target vehicle, then transmit the private message.

According to the at least one example set forth above, the node further comprises: a telematics circuit, wherein the node broadcasts public messages via the telematics circuit; a line-of-sight (LOS)-only circuit, wherein the node transmits the private message via the LOS-only circuit; and a sensor suite that receives image and range data.

According to at least one additional illustrative example, a vehicle node, comprises: a processor; and memory storing instructions, executable by the processor, that comprise, to: identify a blind spot region; based on the identification, request hazard data from an infrastructure station; and in response to the request, receive a message via a line-of-sight (LOS) channel.

According to at least one additional illustrative vehicle example, the instructions further comprise, to: receive a public message from the station via radio frequency (RF).

According to at least one additional illustrative example, a method, comprises: determining, at an infrastructure node, a blind spot region for a target vehicle; identifying that a collision event is likely with an object in the region; and based on the identification, transmitting a private message to the vehicle using a line-of-sight (LOS) transmission.

According to the at least one example set forth above, the method further comprises: broadcasting a public message to the vehicle using radio frequency (RF).

According to the at least one example set forth above, the method further comprises: prior to the identifying, classifying the object and the vehicle.

According to the at least one example set forth above, the method further comprises: for the vehicle, determining path data, speed data, acceleration data, or a combination thereof.

According to the at least one example set forth above, the method further comprises: for the object, determining path data, speed data, acceleration data, or a combination thereof; and then determining the collision event.

According to the at least one example set forth above, the method further comprises: determining whether the object is moving or static.

According to the at least one example set forth above, the method further comprises: tagging the message as private or public based on whether the object is moving or static.

According to the at least one example set forth above, the method further comprises: preparing a plurality of messages that include the private message; and prioritizing the transmission of the private message based on a threat level.

According to the at least one example set forth above, the method further comprises: prior to identifying the collision event, receiving a message from the vehicle; and in response to receiving the message, then transmitting the private message.

According to any of the examples set forth above, the target vehicle is a fully autonomous vehicle.

According to the at least one example set forth above, a computing device comprising a processor and memory is disclosed that is programmed to execute any combination of the examples of the method(s) set forth above.

According to the at least one example, a computer program product is disclosed that includes a computer readable medium that stores instructions executable by a computer processor, wherein the instructions include any combination of the examples of the method(s) set forth above.

Turning now to the figures wherein like reference numerals denote like or similar elements, features or functions, a vehicle-to-infrastructure (V2I) messaging system 10 is shown that comprises at least one target vehicle 12 (also referred to as a vehicle node (v-node)) and at least one infrastructure station 14 (also referred to as an infrastructure node (i-node)) which, as described herein, is configured to provide at least two categories of messages to the vehicle 12. As will be explained in greater detail below, the station 14 may communicate public messages to the target vehicle 12 and/or communicate private messages to the target vehicle 12. In general, public messages may be broadcasted to all vehicles and may include signal and time phase (SPAT) data, MAP data, vehicle ad hoc network (VANET) data, static-hazard data, official vehicle data, or the like (just to cite a few non-limiting examples). While described in greater detail below, private messages may comprise customized information—e.g., dynamic-hazard data. As used herein, static-hazard data pertains to stationary or fixed objects, stationary or fixed obstructions, or the like which—as a result of a predicted path of the target vehicle—may come into contact with the respective target vehicle and/or cause injury to a passenger of the target vehicle, to a bystander (i.e., a pedestrian, cyclist, or the like), or to a passenger of another vehicle. As used herein, dynamic-hazard data pertains to moving objects, moving obstructions, or the like which—as a result of a predicted path of the target vehicle—may come into contact with the respective target vehicle and/or cause injury to a passenger of the target vehicle, to a bystander (i.e., a pedestrian, cyclist, or the like), or to a passenger of another vehicle. As used herein, official vehicle data means information pertaining to an official vehicle such as an emergency vehicle (e.g., police, military, fire, and/or publicly- or privately-operated ambulance or paramedic vehicles, or the like); official vehicle data may comprise information pertaining to an accident or an incident wherein the official vehicle is in a local vicinity of the infrastructure station providing the official vehicle data (e.g., within a 0.25 mile, 0.50 mile, or 1.0 mile range, to name a few examples). Thus, official vehicle data may include information regarding lane or road closures, average traffic speed, detour information, delay information, or the like. Other aspects of the public and private messages will be explained in greater detail below. In addition, following a description of the system elements, examples of computer-implemented messaging processes using the station 14 and target vehicle 12 will be described.

A number of vehicles may operate in the local vicinity of the station 14. Among these, target vehicle(s) 12 are equipped with a vehicle communication system 20 configured to communicate with the station 14 (and other similarly-configured hardware). FIG. 1 illustrates target vehicle 12 as a passenger vehicle; however, vehicle 12 could be any other suitable vehicle type, including a truck, a sports utility vehicle (SUV), a recreational vehicle, a bus, aircraft, marine vessel, or the like that comprises the vehicle communication system 20. (Hereafter, target vehicle 12 will be referred to simply as a 'vehicle 12;' thus, it should be appreciated that the terms vehicle 12 and target vehicle 12 are being used interchangeably). In at least one example, the vehicle 12 is configured to operate in at least one of a plurality of autonomous modes, as defined by the Society of Automotive Engineers (SAE) (which has defined operation at levels 0-5). For example, vehicle 12 may receive and process two- and/or three-dimensional data of its surroundings and further may be programmed and/or configured to store and execute logic instructions embodied in hardware, software, firmware, a combination thereof, or the like, and to enable vehicle 12 to operate with some user assistance (partial autonomy) or without any user assistance (full autonomy). For example, according to levels 0-2, a human driver monitors or controls the majority of the driving tasks, often with no help from the vehicle 12. For example, at level 0 ("no automation"), a human driver is responsible for all vehicle operations. At level 1 ("driver assistance"), vehicle 12 sometimes assists with steering, acceleration, or braking, but the driver is still responsible for the vast majority of the vehicle control. At level 2 ("partial automation"), vehicle 12 can control steering, acceleration, and braking under certain circumstances without human interaction. At levels 3-5, vehicle 12 assumes more driving-related tasks. At level 3 ("conditional automation"), vehicle 12 can handle steering, acceleration, and braking under certain circumstances, as well as monitoring of the driving environment. Level 3 may require the driver to intervene occasionally, however. At level 4 ("high automation"), vehicle 12 can handle the same tasks as at level 3 but without relying on the driver to intervene in certain driving modes. At level 5 ("full automation"), vehicle 12 can handle all tasks without any driver intervention. In at least one example, vehicle 12 is configured to operate in a fully autonomous mode and the V2I messaging system 10 improves situational awareness of the vehicle 12 (operating in its fully autonomous mode). Further, while not required in all examples, infrastructure station 14 communicates private messages to vehicles 12 operating in a fully autonomous mode (e.g., also called autonomous vehicles (AVs)).

The vehicle communication system 20 of vehicle 12 may comprise one or more processors 22 (one is shown for purposes of illustration), memory 24, a telematics circuit 26 for at least receiving public messages, and a line-of-sight only (LOS-only) circuit 28 for sending and/or receiving private messages. As used herein, a public message is one that is broadcasted—i.e., sent from a source to multiple recipients (e.g., from infrastructure station 14 to multiple vehicles (which may include target vehicle 12 and which may not). As used herein, a private message is one that is transmitted from a source to a single recipient (i.e., target vehicle 12); thus, a private message is a type of peer-to-peer (P2P) communication.

Processor 22 may be programmed to process and/or execute digital instructions to carry out at least some of the tasks described herein. Non-limiting examples of processor 22 include a microprocessor, a microcontroller or controller, an application specific integrated circuit (ASIC), a field-programmable gate array (FPGA), one or more electrical circuits comprising discrete digital and/or analog electronic components arranged to perform predetermined tasks or instructions, etc.—just to name a few. And a few non-limiting examples of instructions—storable in memory 24 and/or executable by processor 22—include: to operate vehicle 12 in an autonomous mode (e.g., a fully autonomous mode) by controlling acceleration, braking, steering, and/or the like; to receive—via telematics circuit 26—a public message and control vehicle operation based on the public message; to receive—via LOS-only circuit 28—a private message and control vehicle acceleration, steering, and/or braking based on the private message; to determine that vehicle line-of-sight (LOS) is obstructed by a threshold amount (in one example, 20% of a 360° field-of-view (FOV)) and in response to the determination, transmit—via LOS-only circuit 28—a private request message to infrastructure station 14; and to receive—via LOS-only circuit 28—a private response message from infrastructure station 14 (i.e., in response to sending the private request message), just to name a few exemplary instructions. Additional and more specific examples of instructions which may be used instead of and/or in addition to these examples. Furthermore, these and other instructions may be executed in any suitable sequence. These instructions and the example processes described below are merely embodiments and are not intended to be limiting. In at least one example, processor 22 executes a computer program product stored on a non-transitory computer-readable storage medium (e.g., of memory 24). As used herein, a computer program product means a set of instructions (e.g., also called code).

Memory 24 may include any non-transitory computer usable or readable medium, which may include one or more storage devices or articles. Exemplary non-transitory computer usable storage devices include conventional hard disk, solid-state memory, random access memory (RAM), read-only memory (ROM), erasable programmable read-only memory (EPROM), electrically erasable programmable read-only memory (EEPROM), as well as any other volatile or non-volatile media. Non-volatile media include, for example, optical or magnetic disks and other persistent memory, and volatile media, for example, also may include dynamic random-access memory (DRAM). These storage devices are non-limiting examples; e.g., other forms of computer-readable media exist and include magnetic media, compact disc ROM (CD-ROMs), digital video disc (DVDs), other optical media, any suitable memory chip or cartridge, or any other medium from which a computer can read. As discussed above, memory 24 may store one or more computer program products which may be embodied as software, firmware, or other programming instructions executable by the processor 22—including but not limited to the instruction examples set forth above.

Telematics circuit 26 may comprise any suitable electronics hardware configured to at least receive messages from the infrastructure station 14 via radio frequency (RF). According to one non-limiting example, the telematics circuit 26 includes one or more wireless chipsets—e.g., a short range wireless communication (SRWC) chipset 30, a cellular chipset 32, or a combination thereof. Thus, the telematics circuit 26 may utilize cellular technology (e.g., LTE, GSM, CDMA, and/or other cellular communication protocols), short range wireless communication technology (e.g., Dedicated Short Range Communication (DSRC), Wi-Fi, Bluetooth, Bluetooth Low Energy (BLE), and/or other short range wireless communication protocols), or a combination thereof. While telematics circuit 26 at least may be configured to receive data wirelessly, it also may be configured to transmit data cellularly and/or via SRWC. Further, using telematics circuit 26, vehicle 12 may participate in so-called vehicle-to-vehicle (V2V) and vehicle-to-everything (V2X) communications as well.

LOS-only circuit 28 may comprise a transmitter 34 and/or a receiver 36; i.e., circuit 28 may comprise any suitable electronics hardware configured to transmit line-of-sight (LOS) messages to and/or receive LOS messages from the infrastructure station 14. For example, transmitter 34 may comprise an encoder for encoding the data, a light source for transmitting a light signal, and any other suitable electronics. In operation, the LOS-only circuit 28 may receive data (for transmission) from a vehicle hardware module (not shown; e.g., a control module, an autonomous driving computer, or the like); thereafter, the data may be converted to serial data which then can be transmitted using the light source. In at least one example, transmitter 34 includes a collimator optically aligned with the light source so that the light signal emitted from the light source may be focused at transmission (e.g., into a light beam). Further, the transmitter 34 may be mounted on a three-axis gimbal or other suitable structure so that processor 22 may exercise directional control over the beam. While the LOS-only circuit 28 may operate using visible and/or non-visible wavelengths, according to at least one example, the LOS-only circuit 28 operates using a predominantly non-visible wavelength (e.g., less than 400 nanometers (nm) and greater than 740 nm)—e.g., so as to not be distracting to other vehicle drivers, pedestrians, cyclists, etc. Further, according to at least one example, the power of the light source may be configured to be eye-safe (e.g., designated eye-safe per American National Standards Institute (ANSI)).

The receiver 36 of LOS-only circuit 28 may comprise any suitable optical component for receiving a light signal from infrastructure station 14. For example, the receiver may comprise one or more optical filters and one or more lenses for focusing light signals from infrastructure station 14 onto a detector (e.g., comprising a photodiode or the like), wherein the filter(s), lens(es), and detector typically are aligned along an optical axis. Further, the detector may be electrically coupled to an amplifier circuit, one or more filter circuits, one or more sampling circuits, and a decoder. Thus, when messages are received via the receiver 36, data may be extracted from the light signal and provided by processor 22 to one or more vehicle computers. As will be explained more below, in at least one example, the LOS-only circuit 28 receives private messages via a light-based communication technique (e.g., serial data (e.g., light pulses) sent to target vehicle 12 when vehicle 12 is within a LOS of infrastructure station 14). And in at least one example, the light signal may carry dynamic-hazard data that enables vehicle 12 to avoid a collision.

In one example, the LOS-only circuit 28 comprises only the receiver 36 (i.e., no transmitter). In another example, the LOS-only circuit 28 comprises both the receiver 36 and transmitter 34. The elements of the LOS-only circuit 28 provided above are merely examples. In at least some other examples, different elements and/or different arrangements of elements may be used. In FIG. 1, for purposes of illustration only, the vehicle communication circuit 20 is shown mounted atop vehicle 12 and a light beam L1 (from transmitter 34) is shown being emitted therefrom. Of course, circuit 20 (or component thereof) could be located in other vehicle locations as well.

Turning now to the infrastructure station 14, station 14 comprises a mount 50 and an infrastructure communication system 51 that includes one or more processors 52 (again, for purposes of illustration, only one is shown), memory 54, a telematics circuit 56 that is capable of communicating with telematics circuits 26 of various target vehicles 12, and a LOS-only circuit 58 that correspondingly is capable of communicating with LOS-only circuits 28 of various target vehicles 12. In addition, infrastructure communication system 51 further may comprise a sensor suite 59. In at least one example, the hardware of the one or more processors 52, memory 54, the telematics circuit 56, and the LOS-only circuit 58 may be identical to the processor(s) 22, memory 24, the telematics circuit 26, and the LOS-only circuit 28, respectively; therefore, it will not be re-described in detail here. For example, hardware of telematics circuit 56 may comprise a short range wireless communication (SRWC) chipset 60 and/or a cellular chipset 62 (e.g., adapted for radio frequency broadcasting RF). Similarly, hardware of LOS-only circuit 58 may comprise a transmitter 64 and a receiver 66 (e.g., adapted for light beam transmission L2). And similarly, as described above, processor 52 may control the operation of the telematics circuit 56 and LOS-only circuit 58.

According to at least one example, the LOS-only circuit 58 of infrastructure station 14 comprises multiple transmitters 64—e.g., a quantity (N) of transmitters 64. Having a plurality of transmitters 64 enables station 14 to communicate with multiple target vehicles concurrently—e.g., as each transmission between a respective target vehicle and the station 14 is communicated over a separate LOS-channel. Of course, in at least one example, there may be a corresponding quantity (N) of receivers 66 as well.

However, while the hardware may be the same or similar, at least some of the instructions stored on memory 54 (and executable by processor 52) may differ from those instructions stored on memory 24 (and executable by processor 22). For example, a few non-limiting examples of instructions storable in memory 54 include: to broadcast—via telematics circuit 56—a public message via a land communications network 70, via a wireless communications network 72, or via any other suitable means; in response to receiving the public message (from an upstream computer or server (not shown, but also connected communicatively to station 14)), to broadcast the public message to vehicles 12 (e.g., using the telematics circuit 56); to transmit—via LOS-only circuit 58—a private message for the purpose of influencing the autonomous driving operation of at least one vehicle 12 (e.g., for the purpose of influencing the vehicle's onboard driving computer to adjust its acceleration, steering, and/or braking); to receive sensor data from sensor suite 59; based on receiving sensor data from suite 59, to classify objects within a local vicinity of infrastructure station 14 (e.g., to classify objects into categories of 'vehicle,' 'roadway,' 'curb,' 'sidewalk,' 'pedestrian,' 'cyclist,' 'roadway obstacle' (such as 'ice patch,' 'puddle,' or 'roadway debris'), and the like); based on the classification, to predict paths of moving objects (e.g., to predict paths of a vehicles, pedestrians, cyclists, etc.); to identify vehicular blind spot regions based on a calculated LOS from the point of view of a respective target vehicle 12; to predict dynamic-hazard data (e.g., a potential collision event) based on one or more path calculations and blind spot region identifications; with regard to a vehicle 12 for which dynamic-hazard data is predicted, to transmit—via LOS-only circuit 58—a private message to the respective vehicle 12, wherein the private message indicates to take corrective action, providing the vehicle 12 with information needed to make the corrective action; to receive—via LOS-only circuit 58—a private request message from vehicle 12, wherein the private message requests situational awareness data based on a limited LOS from the point of view of the respective target vehicle 12 (e.g., the vehicle 12 has an obstructed FOV); in response to receiving the private request message, to transmit a private response message from the infrastructure station 14 to the respective vehicle 12 providing situational awareness data, predicted dynamic-hazard data (e.g., including a potential collision event), blind spot region identification, and/or the like. These are just a few exemplary instructions; additional examples of instructions may be used instead of and/or in addition to these example instructions. Furthermore, these and other instructions may be executed in any suitable sequence. Thus, these instructions and the example processes described below are merely embodiments and are not intended to be limiting. In at least one example, processor 52 executes a computer program product stored on a non-transitory computer-readable storage medium (e.g., of memory 54).

Sensor suite 59 may comprise a plurality of sensors 80, 82, 84, 86 that provide sensor data to the processor 52 so that processor 52 can determine various objects, determine other situational awareness data, identify vehicular blind spot regions, predict static- and dynamic-hazard data, and the like. According to one example, sensor 80 may be a camera sensor, sensor 82 may be light detection and ranging (LIDAR) sensor, sensor 84 may be a millimeter (mm) radio detection and ranging (RADAR) sensor, and sensor 86 may be an ultrasonic sensor. In one example of operation, processor 52 receives sensor data from sensors 80-86, overlays or merges sensor data, and uses this sensor data to classify objects. For example, two-dimensional image data from camera sensor 80 can be merged with three-dimensional depth data from the LIDAR sensor 82, the millimeter RADAR sensor 84, and/or the ultrasonic sensor 86. According to one example, processor 52 uses a convolution neural network (CNN) to identify various objects. Alternatively, or in combination therewith, processor 52 may use a feature database (e.g., in memory 54), processor 52 may compare the image data and the depth data with stored features to classify objects. In one example, images are stored in the database and depth data is used to discriminate edges of an object from its background or from other objects. Of course, these identification techniques are merely examples; other techniques may be employed as well.

Figure 2:
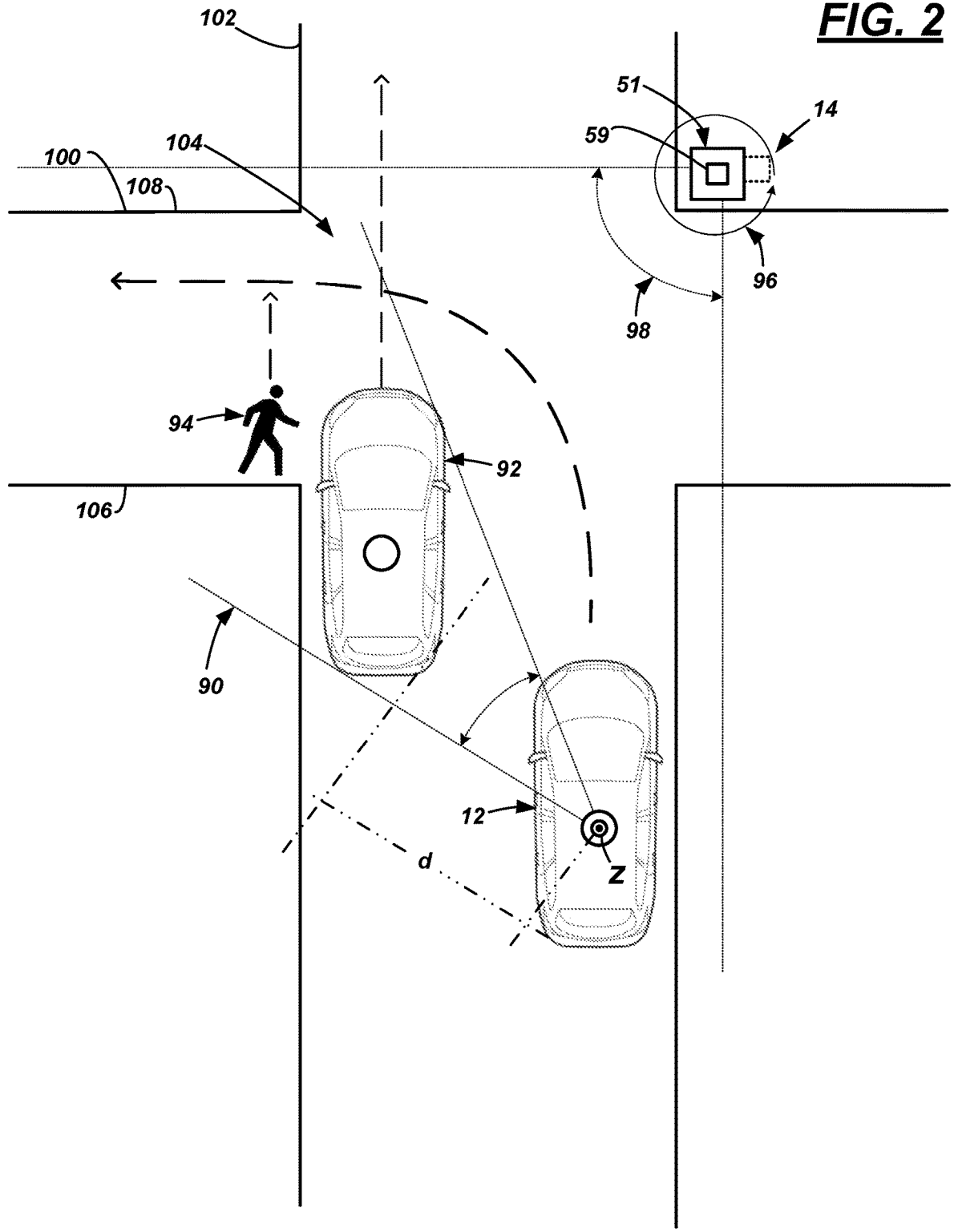
FIG. 2 is a schematic diagram illustrating an example of private messages being communicated using the system shown in FIG. 1.

Thus, using the sensor data from one or more of sensors 80-86 over a period of time (e.g., a number of frames, a series of point clouds, or the like), processor 52 may determine the previous and/or current paths of moving objects, and based on those paths, extrapolate object paths. Further, using any suitable sensor data, the processor 52 may be configured to make calculations regarding speed and acceleration. Furthermore, using depth data associated with one or more objects, processor 52 may predict where the trajectories of two or more objects may intersect (e.g., having a statistical probability of intersection greater than a predetermine threshold)—or similarly, where a single moving object may contact or collide with a stationary object (e.g., again, having a statistical probability of collision greater than a predetermine threshold). As illustrated in part in FIG. 2, processor 52 may identify a blind spot region 90 of target vehicle 12—i.e., identifying blind spot regions based on the relative locations of objects surrounding the target vehicle 12. In this non-limiting example, a first moving object 92 (e.g., a vehicle) is located relative to vehicle 12 in such a manner as to partially block the field-of-view (FOV) of sensors located on vehicle 12 (i.e., sensors thereon which gather image data and/or depth data). Continuing with the example, a second moving object 94 (e.g., a pedestrian) is located relative to vehicle 12 and first object 92 such that the second object 94 is within the blind spot region 90 (i.e., from the point of view of the vehicle 12) (e.g., in the instant example, between ~10 and 11 o'clock positions, with respect to a Z-axis (e.g., vertical) of vehicle 12, wherein vehicle-forward is represented as a 12 o'clock position). However, still continuing with this example, the second moving object 94 is not within a blind spot region of infrastructure station 14. For example, in the illustration, the sensor suite 59 may have a 360° FOV 96 or a secondary FOV 98 (as called a subset FOV 96). In either case, the sensor suite 59 may have line-of-sight (LOS—e.g., not have an obstructed FOV) with regard to the second moving object 94, the vehicle 12, and the interposed first object 92.

Accordingly, infrastructure communication system 51 may calculate path data, speed data, and/or acceleration data of the vehicle 12, the first moving object 92, and the second moving object 94. Then, using that path data, speed data, and/or acceleration data, processor 52 may identify a potential collision event and correspondingly alert vehicle 12 using a private message (comprising dynamic-hazard data that includes a potential collision event of vehicle 12 with second object 94). That is, in this case, a collision of vehicle 12 with the pedestrian is likely, as the pedestrian is presumably undetected by vehicle 12 (due to the target vehicle's blind spot region 90). That is, collision is likely unless vehicle 12 adjusts its path, speed, and/or acceleration.

Camera sensor 80 may be an electronic imaging device—e.g., configured to capture digitally images, video, and the like (e.g., in color, monochrome, etc.). Non-limiting examples of camera sensor 80 include a complementary metal oxide semiconductor (CMOS) and charge-coupled device (CCD) cameras), just to name a couple.

LIDAR sensor 82 may be an electronic depth-detecting device which utilizes an emitted light signal (e.g., from an emitter) and a measured so-called 'return' (e.g., at a detector). The return typically comprises a reflectance of the emitted light signal and returns (e.g., also called reflections) are used to measure depth (e.g., range from the LIDAR sensor 82).

Millimeter RADAR sensor 84 may be an electronic depth-detecting device which utilizes an emitted radio wave signal (e.g., from an emitter) and a measured so-called 'return' (e.g., at a detector). The return typically comprises a reflectance of the emitted radio wave signal (e.g., between 30-300 gigahertz) and returns (e.g., also called reflections) are used to measure depth (e.g., range from the RADAR sensor 84).

Ultrasonic sensor 86 may be an electronic depth-detecting device which utilizes an emitted sound signal (e.g., from an emitter) and a measured so-called 'return' (e.g., at a detector). The return typically comprises a reflectance of the emitted sound signal (e.g., greater than 20 kilohertz) and returns (e.g., also called reflections) are used to measure depth (e.g., range from the ultrasonic sensor 86).

The land communications network 70, as described above, can enable connectivity to public switched telephone network (PSTN) such as that used to provide hardwired telephony, packet-switched data communications, internet infrastructure, and the like. And the wireless communications network 72, as described above, may include satellite communication architecture and/or may include cellular telephone communication over wide geographic region(s). Thus, in at least one example, network 72 includes any suitable cellular infrastructure that could include eNodeBs, serving gateways, base station transceivers, and the like. Further, network 72 may utilize any suitable existing or future cellular technology (e.g., including LTE, CDMA, GSM, etc.). Land and wireless communication networks 70, 72 may be communicatively coupled to another. Further, as discussed below, the infrastructure station 14 may obtain some public messages from the land and/or wireless communications networks 70, 72 and in response, station 14 may broadcast such public messages to local vehicles (e.g., including to vehicle 12).

Figure 3:
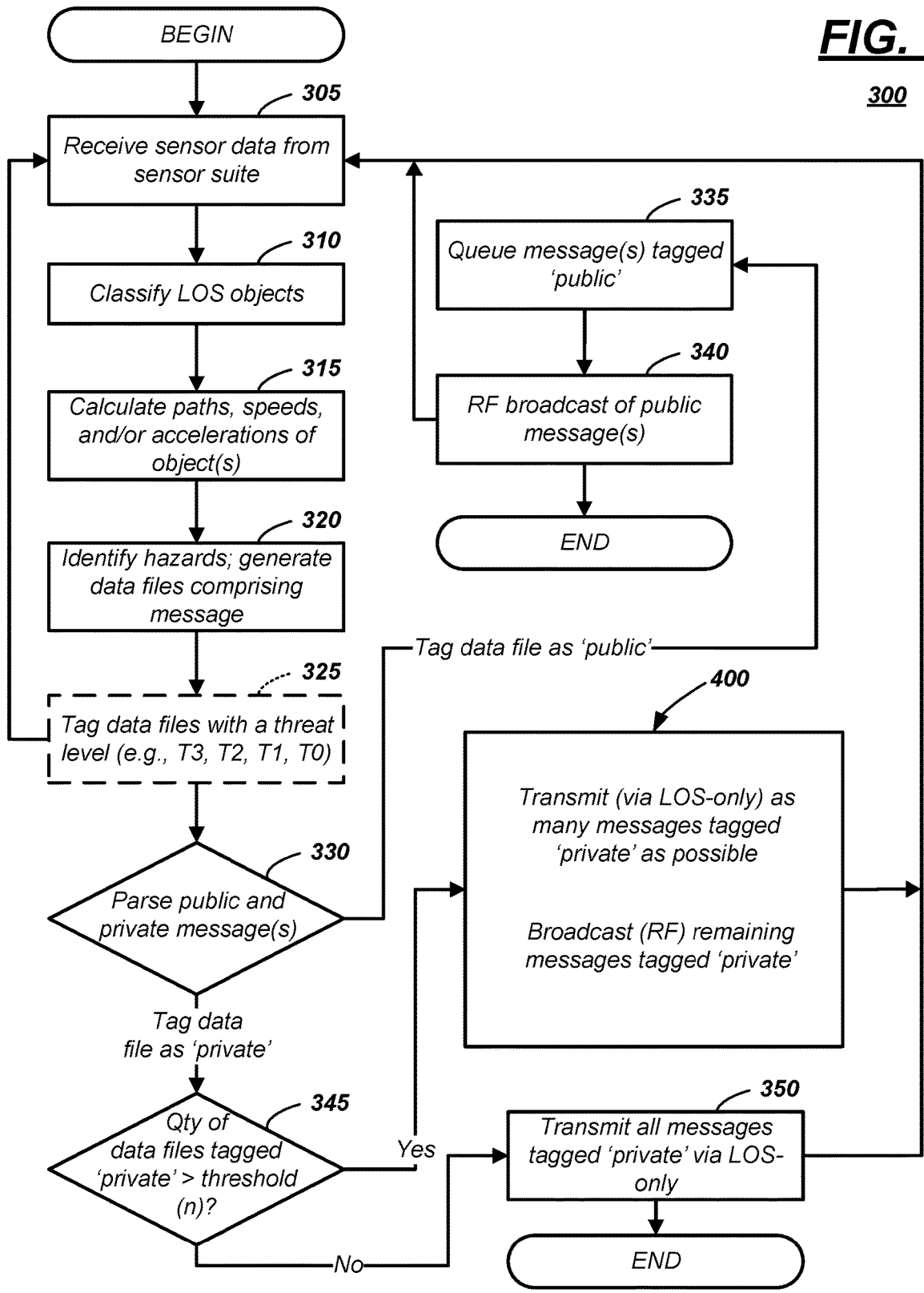
FIG. 3 is a flow diagram illustrating a computer-implemented messaging process that is executable using the system.

Turning now to FIG. 3, a V2I messaging process 300 is described. As will be described more below, the process 300 may enable the infrastructure station 14 to selectively provide private messages to target vehicles (such as vehicle 12) and concurrently, when suitable, broadcast public messages to all local vehicles (target vehicles or non-target vehicles).

Process 300 begins with block 305, wherein infrastructure station 14 receives sensor data via sensor suite 59. This sensor data may include data from the camera sensor 80, the LIDAR sensor 82, the mm RADAR sensor 84, and/or the ultrasonic sensor 86. Upon receipt, this data may be merged or otherwise combined to detect two- and three-dimensional objects in the local vicinity.

In block 310, which follows, processor 52 of station 14 may classify objects—e.g., using a convolution neural network (CNN) technique, via a feature database, and/or via any other suitable technique. Continuing with the illustrated example shown in FIG. 2, processor 52 may classify, among other things, a first roadway 100, a second roadway 102, an intersection 104 of the first and second roadways 100, 102, the target vehicle 12, moving object 92 (hereafter, the term 'object 92' is used interchangeably with 'object vehicle 92'), and moving object 94 (hereafter, the term 'object 94' is used interchangeably with 'pedestrian 94').

Following block 310 (in block 315), processor 52 may calculate—for any suitable objects (e.g., 12, 92, 94)—instantaneous position data, path data, speed data, and/or acceleration data. Thus, continuing with the instant example, processor 52 may predict that target vehicle 12 is making a left turn (from roadway 100 onto roadway 102), that object vehicle 92 may proceed straight along roadway 102, that pedestrian 94 may cross from one side 106 of roadway 100 to an opposite side 108, or the like. According to at least one example, processor 52 may use sensor data from camera sensor 80 to predict that target vehicle 12 is turning (e.g., including extracting turn-signal data, front-wheel position data, or the like).

In block 320, processor 52 may identify static-hazard data and/or dynamic-hazard data based on predicted intersections of moving object 92 and/or moving object 94 with target vehicle 12—within a time domain. For example, processor 52 may predict the intersection of moving object(s) with target vehicle 12 within a time window (e.g., typically less than 4 seconds), wherein the prediction is based on a statistical probability of a collision event that is greater than a predetermined threshold. According to at least one example: (a) the processor 52 identifies the target vehicle's 12 blind spot region(s) 90 (e.g., identifies the region 90 based on the relative positions of object vehicle 92 and target vehicle 12 (e.g., in some instances, the relative location of target vehicle's sensor suite 59 on vehicle 12); the processor identifies whether any static- and/or dynamic-hazard data exists (e.g., based on a calculated path, speed, and acceleration of target vehicle 12 and based on a position, path, speed, or acceleration of other objects within the blind spot region(s) 90) (e.g., such as that of pedestrian 94); and the processor 52 distinguishes the type of hazard data (e.g., if the object with which target vehicle 12 may collide is a moving object or a human (e.g., a moving vehicle, an official vehicle indicating a hazard (e.g., a police, fire, or ambulance vehicle with warning lights flashing, a pedestrian, cyclist, etc.), then processor 52 identifies a dynamic-hazard; and if the object with which target vehicle 12 may collide is a static object (e.g., a pothole, an ice patch on the roadway, water on the roadway, debris on the roadway, parked non-official vehicles on the roadway, parked official vehicles not indicating a hazard but on the roadway, etc.), then processor 52 identifies a static-hazard.

In at least one example of block 320, processor 52 generates data files comprising message(s) for target vehicle 12 and/or non-target vehicles. According to one example, the data file may be array as shown in Example (1)—Data File.

EXAMPLE (1) IDENTIFIER (MESSAGE, TAG, THREAT LEVEL)

The identifier may be an identifier adapted to uniquely parse memory 54 and recall the data file. The message may comprise any suitable information to apprise target vehicle 12 of how to avoid the hazard (e.g., whether it comprise static- or dynamic-hazard data). For example, the message could include information to change the target vehicle's path, speed, or acceleration. It could include information regarding the location of the predicted physical contact or collision during the time-window, thereby permitting computer(s) onboard the vehicle 12 to decide how to avoid collision. It could include lane information, information about the obstructing object (e.g., moving object 92 in FIG. 2), and/or information about the object by which infrastructure station 14 predicts collision (e.g., object 94 in FIG. 2).

According to one example, the tag (of Example (1)) may be binary—e.g., 'private' or 'public.' Thus, the data file may identify whether the message in the file is a private message or a public message. In at least one example, and as described above, if the message pertains to dynamic-hazard data, then the file is tagged 'private,' and if the message pertains to static-hazard data, then the file is tagged 'public.'

'Threat level' in the data file may identify a numerical rank delineating the seriousness of the identified static-hazard data or dynamic-hazard data. This of course may be determined using a statistical calculation at the processor 52. As discussed more below—and by way of example only, four different values are used to illustrate the threat level: T0, T1, T2, and T3, wherein T0 is the lowest threat level, wherein T1 and T2 are increasingly higher threat levels, and wherein T3 is the highest (and most imminent) threat level. According to at least one example, threat levels T0, T1, and T2 may pertain collisions with a vehicle or other non-human object (e.g., according to different impact severity levels of predicted deformation of the target vehicle 12 and/or the object with which the collision occurs), and threat level T3 may be reserved for predicted collisions with a pedestrian, a cyclist, or the like. In at least one example, a Monte Carlo or other suitable simulation may be conducted to predict variations in impact severity. Thus, according to block 325 which may follow block 320, the processor 52 may tag the data file with a predetermined threat level. According to one example, only threat levels greater than a threshold (e.g., T1, T2, or T3) are suitable for private messages. Thus, continuing with this example, if the threat level is T0—even if the potential hazard otherwise constitutes dynamic-hazard data, the processor 52 may alter the identifier's tag to 'public.' Block 325 is optional and is not required in all examples. Other predetermined threshold threat levels may be used instead.

It should be appreciated that blocks 305-325 may occur repeatedly and/or continuously (see process 300 looping back from block 325 to block 305)—e.g., adding new data files to memory 54 as appropriate. Block 330 follows. In block 330, the processor 52 may parse data files stored in memory 54 to determine which messages are tagged 'public' and which are tagged 'private.' When the message is tagged 'public,' process 300 proceeds to block 335 (to process the public message). And when the message is tagged 'private,' process 300 proceeds to block 345 (to process the private message). It should be appreciated that blocks 335-340 may be executed for each 'public' message, and that blocks 345, 350, and 400 may be executed for each 'private' message.

In block 335, the public message is queued (e.g., and/or buffered) in memory 54, and ultimately broadcasted in block 340 (which follows). For example, if the queue is empty, process 300 may proceed from block 335 to block 340 immediately and the public message may be broadcast to the target vehicle 12 and other non-target vehicles as well, using RF-technology (e.g., by DSRC, by cellular communication, or the like). If the queue is not empty, the public message may be stored while other (previously-received) public messages are broadcasted first; e.g., then process 300 may proceed to block 340 and the public message may be broadcasted (e.g., similarly using RF-technology).

Thus, all connected things (at least within the local vicinity) may receive the RF broadcast of block 340. For example, target vehicle 12 may receive the public message, and its onboard autonomous computing system may use the information to operate the vehicle 12 without driver assistance. Other vehicles having a suitable receiver—e.g., such as the moving object vehicle 94 may receive and use the public message; similarly, connected pedestrians 96 and other persons or computers also may receive and use the public message. Following block 340, the process 300 may loop back to block 305 and repeat any suitable part of process 300.

Returning to block 345, processor 52 may determine a quantity of data files (which are tagged 'private') which have not been communicated to target vehicle(s) 12; further, processor 52 may determine whether the quantity is greater than a predetermined threshold (n). The threshold (n) may represent a quantity of transmitters 64 (of infrastructure station 14); consequently, as the transmitters 64 function peer-to-peer, the threshold (n) also may represent a maximum quantity of LOS-channels. In one example, n (the threshold)=N (the quantity of transmitters 64). Thus, in block 345, if the quantity of private messages exceeds n, then process 300 may proceed to block 400. And if the quantity of private messages does not exceed n, then process 300 may proceed to block 350.

In block 350, processor 52 may utilize any suitable quantity of transmitters 64 (and the corresponding LOS-channels) to transmit each of the private messages concurrently. For example, the processor 52 may communicate the respective private messages to the respective target vehicles—each using a separate one of the N-quantity of LOS transmitters 64 (and each via a separate LOS-channel). Thereafter, the process may loop back to block 305 and repeat any suitable aspect of process 300, as described above.

Figure 4:
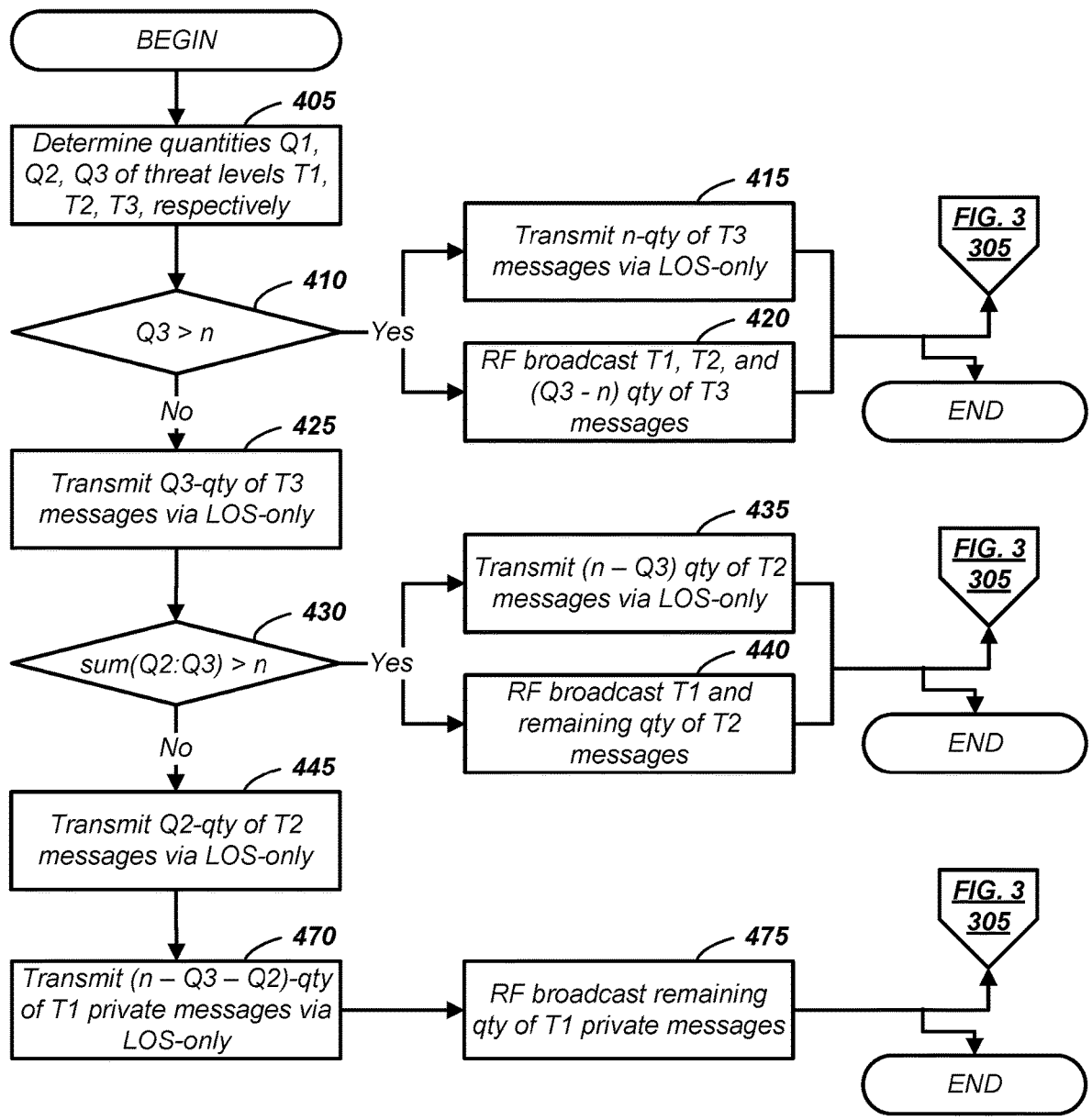
FIG. 4 is a flow diagram illustrating an illustrative example of an instructional block shown in FIG. 3.

In block 400, processor 52 may utilize all available transmitters 64 to transmit private messages concurrently and also concurrently broadcast—via RF—those private messages not being transmitted by transmitters 64. In this manner, the private messages are received timely by the target vehicles 12 so that evasive (if necessary) action can be taken. FIG. 4 illustrates one example of block 400—wherein private messages are prioritized and sent. Following block 400, the process may loop back to block 305 and repeat as described above; alternatively, process 300 may end.

Figure 5:
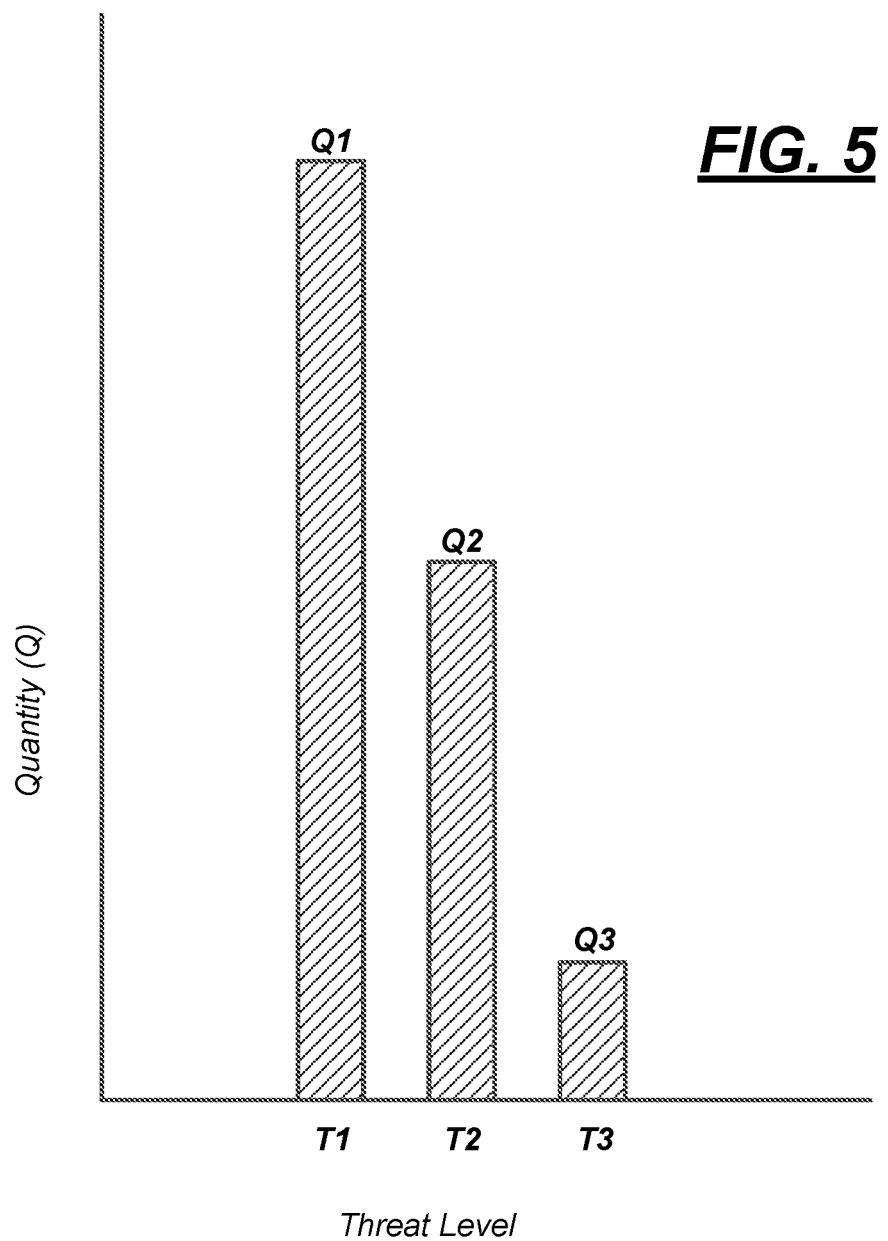
FIG. 5 is a graphical depiction of an illustrative quantification of different types of threat levels.

Block 400 (also referred to as process or sub-process 400) may begin with block 405, wherein processor 52 quantifies private messages having different threat levels. Recall that—in the instant example—four threat levels are used (T0, T1, T2, and T3); however, only threat levels T1, T2, and T3 are tagged as 'private'—and thus may be under evaluation in process 400. Thus, for purposes of illustration only, quantities Q1, Q2, and Q3 (corresponding respectively to T1, T2, and T3) will be considered, wherein Q1, Q2, and Q3 are numbers of objects to be ranked as threat levels T1, T2, T3, respectively. In block 405, these quantities may be determined by processor 52. FIG. 5 is a graphical depiction of quantities Q1, Q2, and Q3 (these values are merely examples).

In block 410 (which follows), processor 52 determines whether the quantity Q3 is greater than the threshold quantity (n) of transmitters 64 (whether Q3>n). When Q3 is greater than n, then process 400 proceeds to blocks 415 and 420, and when Q3 is not greater than n, the process 400 proceeds to block 425.

Blocks 415 and 420 may occur concurrently. In block 415, n-quantity of private messages designated T3 are transmitted via LOS-channels (using LOS-only circuit 58) and, in block 420, the remaining private messages are sent via RF (via telematics circuit 56). More particularly, in block 420, RF communication is used to broadcast private messages designated with threat levels T1 and T2, as well as any remaining private messages designated with a T3 threat level (i.e., Q3>n). Thereafter, process 400 proceeds to block 305 (FIG. 3) or ends.

In block 425—wherein Q3 is less than n, all Q3-quantity of T3 private messages are transmitted via a LOS-channel (using LOS-only circuit 58). And the remaining private messages are communicated in the blocks that follow.

In block 430 (which follows), processor 52 determines whether the sum of quantities Q2 and Q3 is greater than the threshold quantity (n) of transmitters 64 (whether [Q3+Q2] >n). When Q3+Q2 is greater than n, then process 400 proceeds to blocks 435 and 440, and when Q3+Q2 is not greater than n, the process 400 proceeds to block 445.

Blocks 435 and 440 may occur concurrently. In block 435, n-quantity of private messages designated T2 are transmitted via LOS-channels (using LOS-only circuit 58) and, in block 440, the remaining private messages are sent via RF (via telematics circuit 56). More particularly, in block 440, RF communication is used to broadcast private messages designated with threat level T1, as well as any remaining private messages designated with a T2 threat level (i.e., Q3+Q2−n). Thereafter, process 400 proceeds to block 305 (FIG. 3) or ends.

In block 445—wherein Q3+Q2 is less than n, all Q2-quantity of T2 private messages are transmitted via a LOS-channel (using LOS-only circuit 58). Recall that, in this scenario, all Q3-quantity of T3 private messages were previously transmitted (block 425). Thus, the remaining private messages are communicated in the blocks that follow.

In this example, wherein only T1, T2, and T3 messages were designated to be 'private,' following block 445, only Q1 private messages (designated T1) remain. Thus, in block 470, processor 52 transmits as many private messages (designated T1) via LOS-channels as possible and, in block 475, the remaining are broadcasted via telematics circuit 56. More particularly, processor 52 may transmit [n−Q3−Q2]-quantity of private messages designated T1 via LOS-only circuit 58. These remaining private messages ($R_{PRIVATE}$) may be determined by the following equation: $R_{PRIVATE}=|n-(Q3+Q2+Q1)|$. Thereafter, process 400 proceeds to block 305 (FIG. 3) or ends.

Thus, process 300 includes identifying hazards, quantifying the hazards using a threat level, broadcasting some messages (public) via the telematics circuit 56 (of station 14), and transmitting other messages (private) via the LOS-only circuit 58 (also of station 14). In this manner, wireless congestion is reduced (thereby improving communication performance), while increasing communication traffic between vehicles and infrastructure. Process 400 illustrates an illustrative technique of prioritizing private messages so that those with the highest threat level are delivered with less risk of wireless communication interference and low latency.

Figure 6:
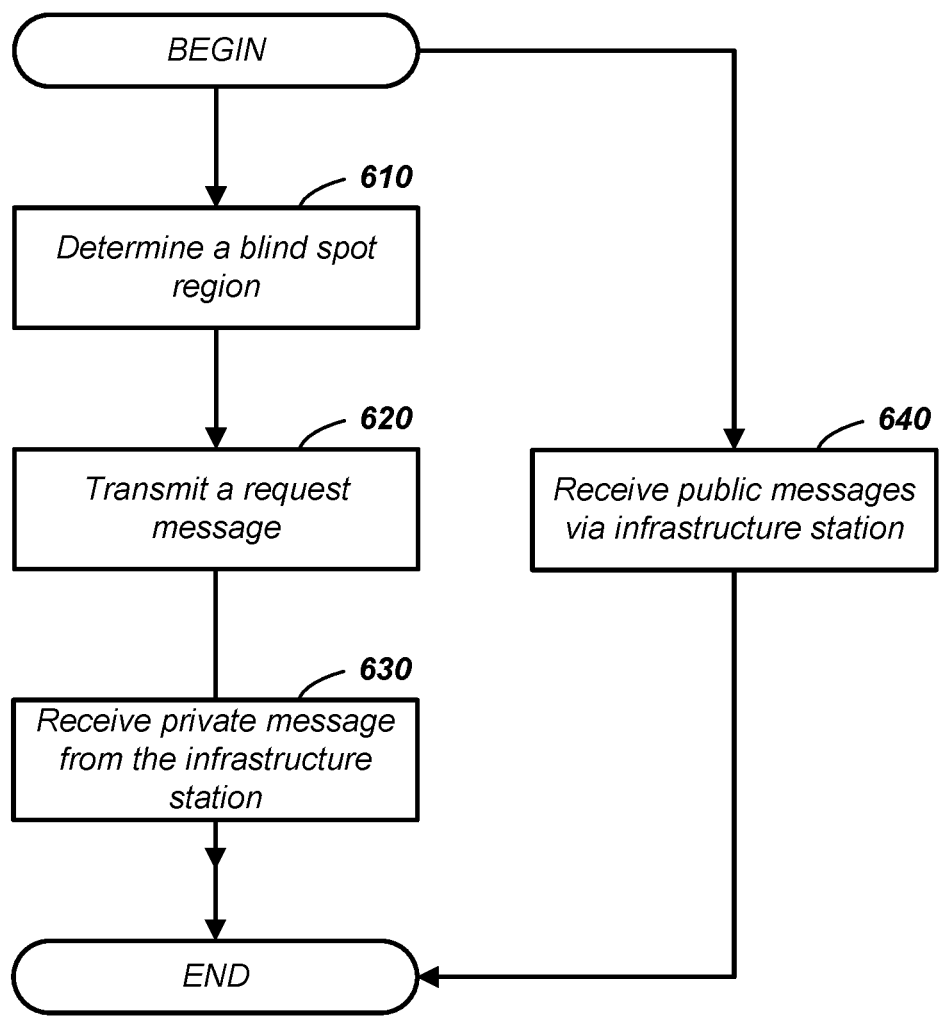
FIG. 6 is a flow diagram illustrating a process of a target vehicle requesting messages from an infrastructure station.

Other examples also exist. The processes 300 and/or 400 above may include target vehicle 12 requesting situational awareness (SA) data. For example, vehicle 12 may determine that a blind spot region (e.g., such as 90) exists—e.g., it may determine using range data that an object (e.g., 92, FIG. 2) is within a threshold distance (d) and/or that the object has a two-dimensional projection larger than a predetermined threshold (A). And based on the determinations of d and/or A, processor 52 may determine a blind spot region 90 exists. FIG. 6 illustrates that processor 22 may request information from infrastructure 14.

For example, a process 600 may begin with block 610, wherein processor 22 determines a blind spot region (e.g., using distance d, 2D projection A, or any other suitable technique).

Following block 610 and based on the determination of the blind spot region, processor 22 may transmit a request message from infrastructure station 14 (e.g., via telematics circuit 26 and/or LOS-only circuit 28) (block 620). In at least one example, vehicle 12 identifies itself as a target vehicle by transmitting the message via LOS-only circuit 28.

Following block 620, in response to vehicle 12 transmitting the request message, vehicle 12 may receive (e.g., via LOS-only circuit 28) a private message—e.g., information pertaining to a prospective hazard (e.g., as discussed with respect to processes 300, 400 above). Following block 630, the process 600 may end.

FIG. 6 illustrates that public messages may be broadcast by infrastructure station 14 during blocks 610-630 and received at vehicle 12 via telematics circuit 26. Thus, vehicle 12 may receive both public and private messages, may receive them concurrently in some instances, and the private messages in at least some examples may be triggered by the target vehicle 12 sending a LOS-channel message.

Figure 7:
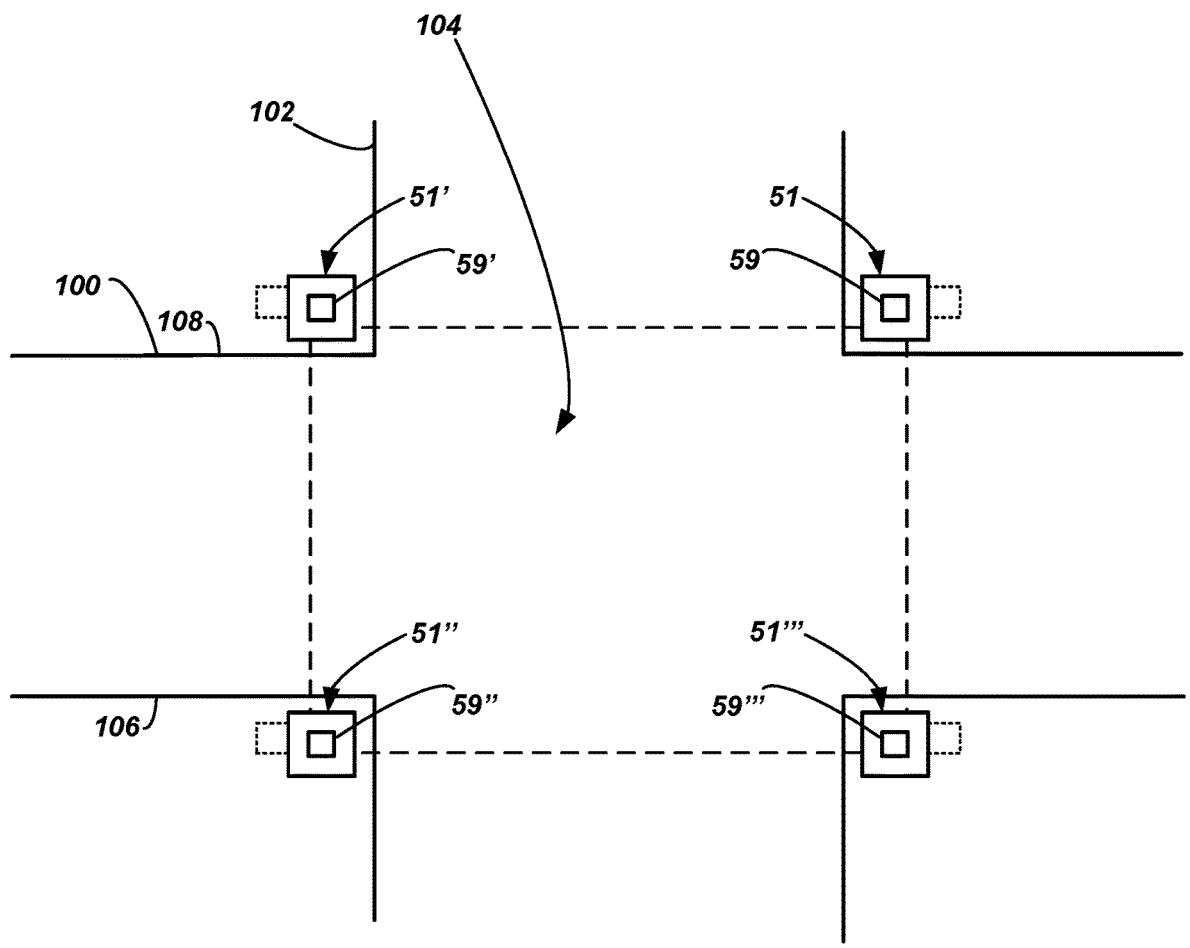
FIG. 7 is an example of an infrastructure communication system, different from an infrastructure communication system shown in FIG. 1.

Still other examples exist. For example, FIG. 7 illustrates that multiple infrastructure stations 14, 14', 14", 14''' may be used. As above, like numerals designate identical or similar hardware. Thus, for example, infrastructure stations 14', 14", 14''' may comprise infrastructure communication systems 51', 51", 51''', respectively, and sensor suites 59', 59", 59''', respectively. Accordingly, the quantity of transmitters 64 may increase four-fold, and the quantity of LOS-only channels correspondingly increases. Further, by spacing the infrastructure stations 14, 14', 14", 14''' on respective corners of intersection 104, blind spot of the respective infrastructure stations may be minimized. Of course, four stations are merely an example; more or fewer may be used in other examples.

Thus, there has been described a vehicle-to-infrastructure messaging system. The system facilitates public and private messaging and uses both radio frequency (RF) communication and light-communication (via line-of-sight techniques).

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data. Processing the data may include processing the video feed or other data stream captured by the sensors to determine the roadway lane of the host vehicle and the presence of any target vehicles. As described below, the processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An infrastructure node, comprising:
   a plurality of transmitters each utilizing a different line-of-sight (LOS) channel;
   a processor communicatively coupled to the plurality of transmitters; and
   memory storing instructions, executable by the processor, that comprise, to:
     broadcast at least one public message to a plurality of recipients, wherein the plurality of recipients comprise a plurality of target vehicles;
     identify at least one hazard to the plurality of target vehicles;
     determine that a quantity of the plurality of target vehicles exceeds a threshold; and
     based on the identification and the determination, transmit a first quantity of private messages via the plurality of transmitters wherein the first quantity is the same as the threshold and broadcast a remaining quantity of private messages;
   wherein the at least one public message comprises static-hazard data, wherein static-hazard data comprises data pertaining to stationary or fixed objects or stationary or fixed obstructions which have a statistical likelihood of coming into contact with at least one of the plurality of recipient vehicles, causing injury to a passenger of the at least one of the plurality of recipient vehicles, or to causing injury to a bystander;
   wherein each of the first quantity of private messages and each of the remaining messages comprise dynamic-hazard data, wherein dynamic-hazard data comprises data pertaining to moving objects or moving obstructions which, as a result of a predicted path of the target vehicle, have a statistical likelihood of at least one of the following: coming into contact with the target vehicle, causing injury to a passenger of the target vehicle, causing injury to a bystander, or causing injury to a passenger of another vehicle.

2. The node of claim 1, wherein identifying the at least one hazard further comprises determining a blind spot region of the target vehicle.

3. The node of claim 1, wherein the instructions further comprise, to: concurrent to the transmission of the first quantity of private messages or the remaining messages, broadcast the at least one public message using radio frequency (RF).

4. The node of claim 1, wherein identifying the at least one hazard further comprises, to: determine path data, speed data, acceleration data, or a combination thereof of the target vehicle.

5. The node of claim 4, wherein identifying the at least one hazard further comprises, to: classify an object using sensor data; determine path data, speed data, acceleration data, or a combination thereof of the object; and determine a collision event involving the target vehicle and the object.

6. The node of claim 1, wherein identifying the at least one hazard further comprises, to: determine that the at least one hazard pertains to a dynamic hazard; and based on the determination, determine to transmit the first quantity of private messages and the remaining messages.

7. The node of claim 1, wherein transmitting the first quantity of private messages and the remaining messages further comprises, to: prioritize, based on a threat level, the first quantity of private messages and the remaining messages.

8. The node of claim 1, wherein the instructions further comprise, to: prior to identifying the at least one hazard, receive a communication from one of the plurality of target vehicles; and in response to receiving the communication from the one of the plurality of target vehicles, then transmit the respective target vehicle one of the first quantity of private messages.

9. The node of claim 1, further comprising:
a telematics circuit, wherein the node broadcasts the at least one public message via the telematics circuit;
a line-of-sight (LOS)-only circuit comprising the plurality of transmitters, wherein the node transmits the first quantity of private messages via the LOS-only circuit; and
a sensor suite that receives image and range data.

10. The node of claim 1, wherein the threshold is associated with a quantity of the plurality of transmitters.

11. A method, comprising:
from an infrastructure node comprising a plurality of transmitters each utilizing a different line-of-sight (LOS) channel:
broadcasting at least one public message to a plurality of recipients, wherein the plurality of recipients comprise a plurality of target vehicles;
determining a blind spot region for a target vehicle, wherein the target vehicle is one of the plurality of recipients;
identifying that a likelihood of at least one collision event with an object in the region;
determine that a quantity of the plurality of target vehicles exceeds a threshold; and
based on the identification and the determination, transmitting a first quantity of private messages via the plurality of transmitters wherein the first quantity is the same as the threshold and broadcasting a remaining quantity of private messages;
wherein the at least one public message comprises static-hazard data, wherein static-hazard data comprises data pertaining to stationary or fixed objects or stationary or fixed obstructions which have a statistical likelihood of coming into contact with at least one of the plurality of recipient vehicles, causing injury to a passenger of the at least one of the plurality of recipient vehicles, or to causing injury to a bystander;
wherein each of the first quantity of private messages and each of the remaining messages comprise dynamic-hazard data, wherein dynamic-hazard data comprises data pertaining to moving objects or moving obstructions which, as a result of a predicted path of the target vehicle, have a statistical likelihood of at least one of the following: coming into contact with the target vehicle, causing injury to a passenger of the target vehicle, causing injury to a bystander, or causing injury to a passenger of another vehicle.

12. The method of claim 11, further comprising: broadcasting the at least one public message to the vehicle using radio frequency (RF).

13. The method of claim 11, further comprising: prior to the identifying, classifying the object and at least one of the plurality of target vehicles.

14. The method of claim 11, further comprising: for at least one of the plurality of target vehicles, determining path data, speed data, acceleration data, or a combination thereof.

15. The method of claim 14, further comprising: for the object, determining path data, speed data, acceleration data, or a combination thereof; and then determining the at least one collision event.

16. The method of claim 11, further comprising: determining that a second object is static, wherein the at least one public message comprises data related to the second object.

17. The method of claim 11, further comprising: determining whether to tag a message as public or private based on whether an associated object is moving or static.

18. The method of claim 11, further comprising: determining the first quantity of private messages based on a prioritization, wherein the prioritization is based on a threat level.

19. The method of claim 11, further comprising: prior to identifying the at least one collision event, receiving a message from the vehicle; and in response to receiving the message, then transmitting the respective private message.

20. The method of claim 11, wherein the threshold is associated with a quantity of the plurality of transmitters.

* * * * *